United States Patent
Ladouceur et al.

(10) Patent No.: US 7,372,959 B2
(45) Date of Patent: May 13, 2008

(54) HANDHELD ELECTRONIC DEVICE WITH RECONFIGURABLE KEYPAD

(75) Inventors: Norman M. Ladouceur, Waterloo (CA); Jason T. Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/301,095

(22) Filed: Dec. 12, 2005

(65) Prior Publication Data

US 2007/0133788 A1 Jun. 14, 2007

(51) Int. Cl.
*H04M 1/00* (2006.01)
*G06F 3/02* (2006.01)

(52) U.S. Cl. .................... 379/433.07; 379/433.01; 379/433.12; 345/168; 345/169

(58) Field of Classification Search .......... 455/433.07, 455/433.01, 433.04, 433.06, 433.11, 433.12, 455/440; 345/168, 169; 361/680, 686; 379/433.07, 379/433.01, 433.04, 433.06, 433.11, 433.12, 379/440

See application file for complete search history.

(56) References Cited

U.S. PATENT DOCUMENTS

| | | | |
|---|---|---|---|
| 4,633,322 A | | 12/1986 | Fourny |
| 4,636,593 A | * | 1/1987 | Novak et al. ............... 200/5 A |
| 5,488,496 A | | 1/1996 | Pine |

(Continued)

FOREIGN PATENT DOCUMENTS

EP 1 249 120 B 4/2004

(Continued)

*Primary Examiner*—Rafael Perez-Gutierrez
*Assistant Examiner*—My X Nguyen
(74) *Attorney, Agent, or Firm*—Brij K. Agarwal; Eckert Seamans Cherin & Mellot, LLC

(57) ABSTRACT

An improved handheld electronic device has a display and a keypad, with the keypad being movable among a number of configurations that enable the "real estate" occupied by the keypad to be increased or decreased, and to correspondingly enable the viewable area of the display to be relatively decreased and increased, respectively. In one aspect, a first keypad portion and a second keypad portion can be disposed substantially coplanar when the keypad is in a first position and disposed noncoplanar when in a second position. In another aspect, a device can include a keypad and a flexible sheet-like piece of covering material structured to overlie a display, with the keypad and the piece of covering material being connected together. In another aspect, a keypad assembly can being movable between a first position wherein at least a portion of the keypad overlies a first area of a display and is operable to provide input, and a second position overlying one of none of the display and a second area of the display smaller than the first area. In another aspect, a method of operating a device includes translating at least a portion of a keypad apparatus between a first position overlying a first area of a display and second position overlying one of none of the display and a second area of the display smaller than the first area. In another aspect, a method of protecting a device includes overlying at least a portion of a display with at least a portion of a keypad apparatus. In another aspect, a method of adjusting a device between an ON condition and an OFF condition includes translating at least a portion of a keypad assembly between a first position and a second position.

23 Claims, 14 Drawing Sheets

U.S. PATENT DOCUMENTS

| | | | |
|---|---|---|---|
| 6,121,958 A | * | 9/2000 | Clark et al. ................. 345/168 |
| 2002/0158967 A1 | | 10/2002 | Janick et al. |
| 2004/0207604 A1 | | 10/2004 | Chuang |

FOREIGN PATENT DOCUMENTS

| | | |
|---|---|---|
| FR | 2836319 | 8/2003 |
| GB | 2 396 769 A | 6/2004 |
| GB | 2396769 A * | 6/2004 |

* cited by examiner

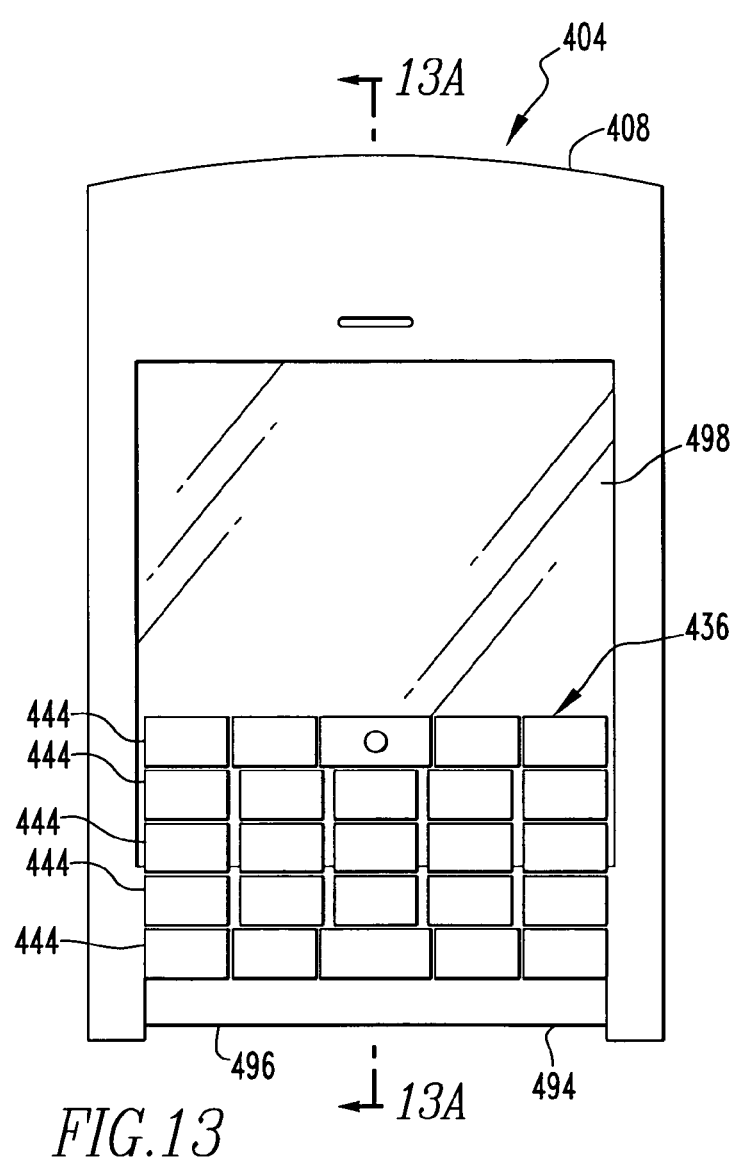
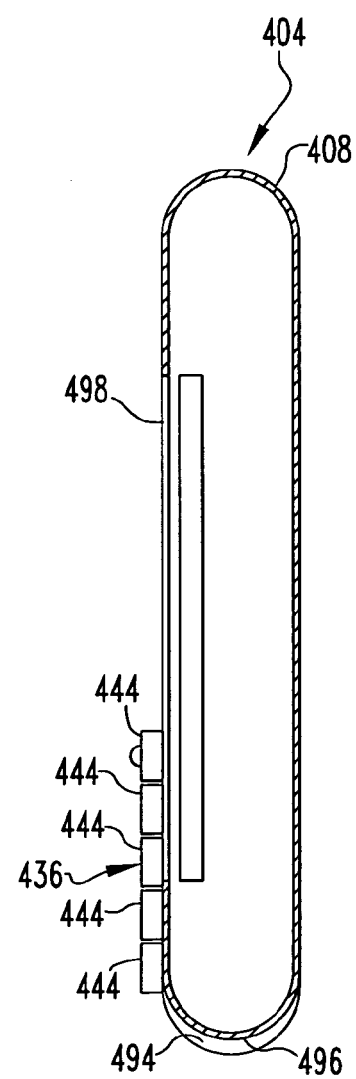
FIG. 13
FIG. 13A

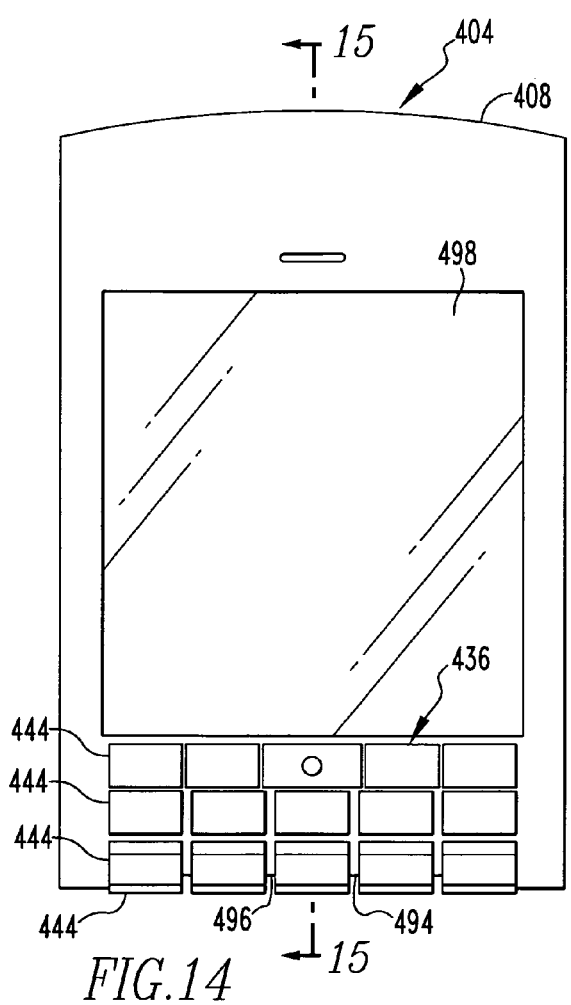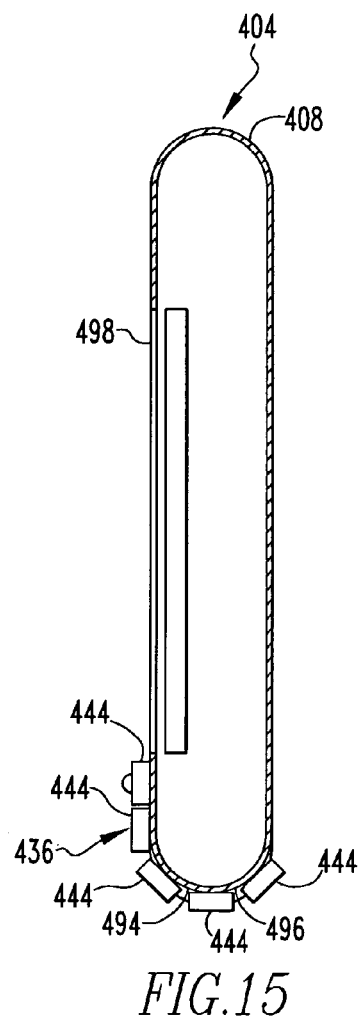

HANDHELD ELECTRONIC DEVICE WITH RECONFIGURABLE KEYPAD

BACKGROUND

1. Field

The disclosed and claimed concepts relates generally to a handheld electronic devices and, more particularly, to a handheld electronic device having a keypad that can be placed in any of a plurality of configurations.

2. Description of the Related Art

Numerous types of handheld electronic device are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices. Handheld electronic devices are generally intended to be portable and thus are of a relatively compact configuration. With advances in technology, handheld electronic devices are built to have progressively smaller form factors yet have progressively greater numbers of applications and features resident thereon.

A typical handheld electronic device has a keypad, a display, and other components. A handheld electronic device usually is configured to apportion the valuable "real estate" between the display, the keypad, and the other components of the handheld electronic device to provide a desirable compromise between usability of the keypad and viewability of the display and for other reasons. While such devices have been generally effective for their intended purposes, such devices have not, however, been without limitation.

Certain applications that are executable on a handheld electronic device are relatively display-focused, meaning that they require and can benefit more from a relatively larger display than from a relatively larger or more complex keypad. A video-playing routine would be an example of such an application. On the other hand, other applications can be relatively keypad-focused, meaning that they require and benefit relatively more from a complex keypad than from a larger display. A word processor would be an example of this type of application. A user's desired mix of applications and the user's personal preferences might be indicative of whether a relatively more display-focused handheld electronic device or a relatively more keypad-focused handheld electronic device would be most suited to the user. However, known handheld electronic devices typically are configured to appeal to large numbers of users having diverse needs, and such devices thus typically are neither display-focused nor keypad-focused. A user thus is often required to choose a handheld electronic device that somewhat or largely meets his or her particular needs regarding being display-focused or keypad focused, but may not be exactly what the user wants, which is undesirable. It thus would be desirable to provide an improved handheld electronic device that meets these and other needs.

BRIEF DESCRIPTION OF THE DRAWINGS

A full understanding from the disclosed and claimed concepts can be gained from the following Detailed Description when read in conjunction with the accompanying drawings in which:

FIG. 13 is a front elevational view of a handheld electronic device in accordance with another embodiment of the disclosed and claimed concept, with a keypad of the handheld electronic device being in a first configuration;

FIG. 13A is a sectional view as taken along line 13A-13A of FIG. 13;

FIG. 14 is a front elevational view of the handheld electronic device of FIG. 13, with the keypad thereof in a second configuration;

FIG. 15 is a sectional view as taken along line 15-15 of FIG. 14;

Similar numerals refer to similar parts throughout the specification.

DETAILED DESCRIPTION

Figure 1:
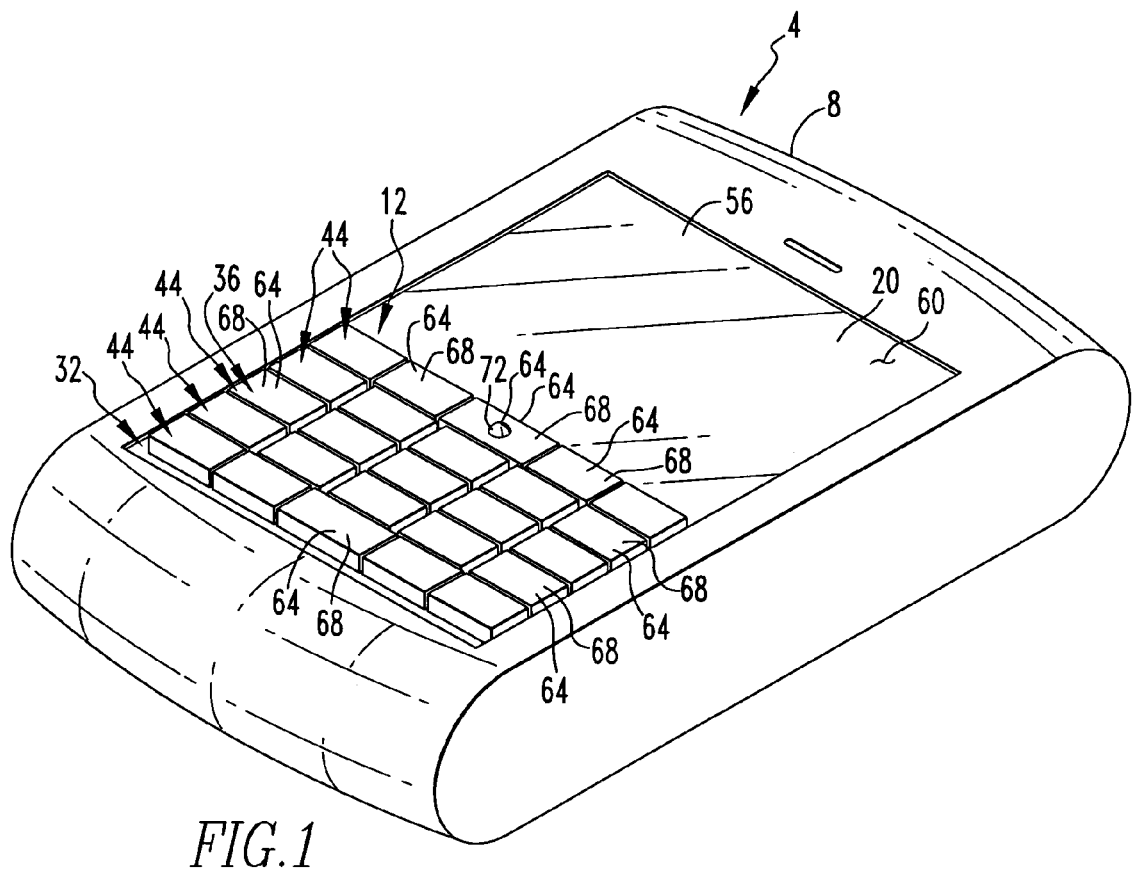
FIG. 1 is a perspective view of an improved handheld electronic device in accordance with the disclosed and claimed concepts wherein a keypad of the handheld electronic device is in a first configuration.
Figure 2:
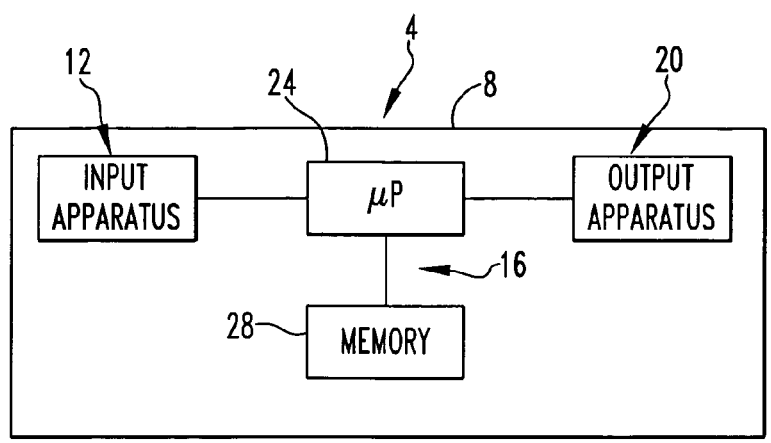
FIG. 2 is a schematic depiction of the handheld electronic device of FIG. 1.

An improved handheld electronic device 4 in accordance with a first embodiment of the disclosed and claimed concepts is depicted generally in FIGS. 1, 1A, 3, 3A, and 5, and is depicted schematically in FIG. 2. The improved handheld electronic device 4 includes a housing 8 upon which are disposed an input apparatus 12, a processor apparatus 16, and an output apparatus 20. As can be understood from FIG. 2, the processor apparatus 16 includes a processor 24 and a memory 28. The processor 24 can be, for instance and without limitation, a microprocessor (μP), and it is responsive to input from the input apparatus 12 and provides output signals to the output apparatus 20.

The processor 24 interfaces with the memory 28. The memory 28 can be any one or more of RAM, ROM, EPROM(s), EEPROM(s), and the like that provide a storage register for data storage such as in the fashion of an internal storage area of a computer, and can be volatile memory or nonvolatile memory. The memory 28 additionally includes a number of routines stored therein that are executable on the processor 24 and that can be in any of a variety of forms such as, without limitation, software, firmware, and the like.

As can be understood from FIGS. 1, 1A, 1B, 4, and 4A, the input apparatus 12 includes a keypad assembly 32 that comprises a keypad 36 and a covering sheet 40. The keypad assembly 32 is advantageously movable among a plurality of configurations, which enhances the versatility and usability of the handheld electronic device 4. The exemplary keypad 36 is in the form of a reduced keyboard, such as would typically include a plurality of letters or other linguistic elements on each of many of the keys. It is noted, however, that the letters and/or linguistic elements are not depicted in any of the embodiments herein for purposes of clarity. The specific number of rows and columns depicted herein is not intended to be limiting, it being noted that other keypad configurations in accordance with the disclosed and claimed concepts can have other numbers of rows and columns of keys.

The keypad 36 includes a plurality of keypad portions 44 and a plurality of connections 48. The keypad portions 44 are disposed adjacent one another. One of the connections 48 extends between each adjacent pair of the keypad portions 44. In the present depicted exemplary embodiment the connections 48 are flexible and provide electrical connections among the keypad portions 44 and the processor 24. The exemplary connections 48 depicted herein are in the nature of one or more Mylar boards that have electrical tracings thereon in the fashion of a printed circuit board, that flexibly connect together adjacent keypad portions 44, and that enable the communication of electrical signals therebetween. The connections 48 could, for instance, together be in the nature of a single Mylar board upon which the various keypad portions 44 are disposed or are constructed. Alternatively, the connections 48 could be separate flexible members. In this regard, the connections 48 could be hinges or other structures without departing from the disclosed and claimed concept. It is noted that the depicted spacing between adjacent keypad portions and the size of the connections has been exaggerated in the accompanying drawings for purposes of illustration.

The connection 48 between an adjacent pair of the keypad portions 44 enables one of the keypad portions 44 to be movable with respect to the other keypad portion 44, with such movement in the present exemplary embodiment being pivoting movement. Each keypad portion 44 has a facing surface 52, i.e., an undersurface, that is substantially planar.

The output apparatus 20 includes a display 56 having a substantially planar display surface 60. The display 56 can be any of a variety of structures that provide visual output to a user and can include, for instance and without limitation, LCD screens, and the like without limitation. Output on the display 56 is not expressly depicted herein for purposes of clarity.

Each exemplary keypad portion 44 includes a number of input members 64. As employed herein, the expression "a number of" and variations thereof shall refer broadly to any nonzero quantity, including a quantity of one. The exemplary input members 64 depicted herein can include keys 68 and a track ball 72, for example, or can include other structures. The exemplary keypad 36 is in the form of a reduced keyboard, such as would typically include a plurality of letters or other linguistic elements on each of many of the keys 68. It is noted, however, that such letters and/or linguistic elements are not depicted herein for purposes of clarity. It is also noted that the reduced keypad configuration of the keypad 36 is exemplary only, and a keypad in accordance with the disclosed and claimed concepts can be of configurations other than those shown in the accompanying figures.

As mentioned above, the keypad assembly 32 is advantageously movable among a plurality of configurations. For instance, the keypad assembly 32 can be configured such that the keypad 36 is in a fully deployed configuration, as is depicted generally in FIGS. 1, 1A, and 1B. As employed herein, the expression "deployed" and variations thereof in the context of a keypad portion shall refer broadly to a condition wherein the keypad portion is disposed at an exterior of the housing 8 and is operable to provide input to the processor 24. The keypad assembly 32 can be moved to a different configuration, such as is depicted generally in FIGS. 3, 3A, and 4, wherein the keypad 36 is in a configuration at least partially retracted. As employed herein, the expression "retracted" and variations thereof in the context of a keypad portion shall refer broadly to a condition wherein the keypad portion does not overlie the display 56 and/or wherein the facing surface 52 thereof is oriented at an angle nonparallel with the display surface 60. In the exemplary embodiments depicted herein, a given keypad portion 44 is in a deployed condition when the facing surface 52 thereof is oriented substantially parallel with the display surface 60. By way of example, a retracted keypad portion 44 may be inoperable to provide input to the processor 24 and/or may be at least partially disposed within an interior 80 of the housing 8 and/or may be disposed such that the facing surface 52 thereof is oriented at an angle nonparallel with the display surface 60.

In the example depicted in FIGS. 1-4A, the keypad assembly 32 is movable among a variety of configurations, only two of which are expressly depicted therein. The display 56 is of a relatively large size, and in many of the configurations of the keypad assembly 32 one or more of the keypad portions 44 overlie the display 56, thus rendering that portion of the display 56 unobservable by the user and thus unused by the processor 24 for output.

Figure 1A:
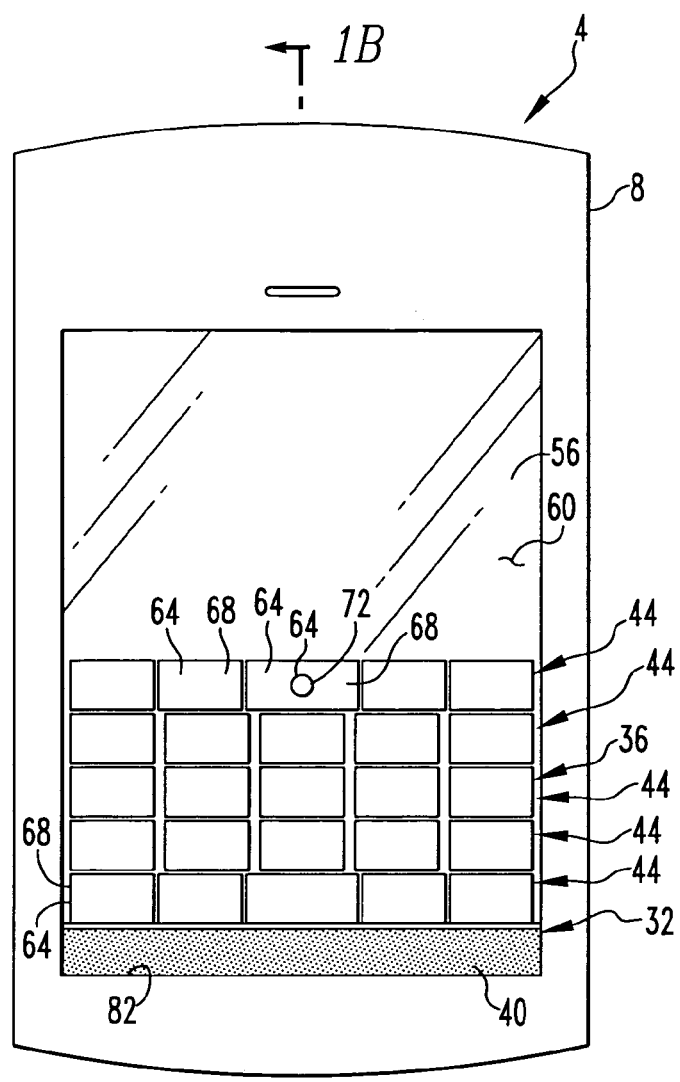
FIG. 1A is a front elevational view of the handheld electronic device of FIG. 1.
Figure 1B:
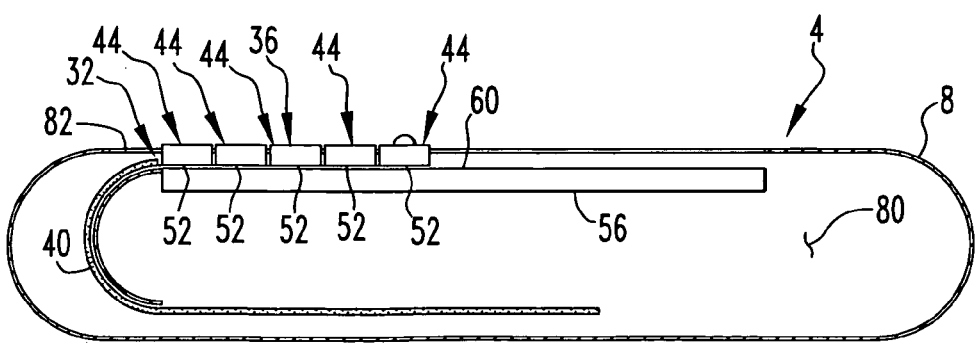
FIG. 1B is a sectional view as taken along line 1B-1B of FIG. 1A.
Figure 3:
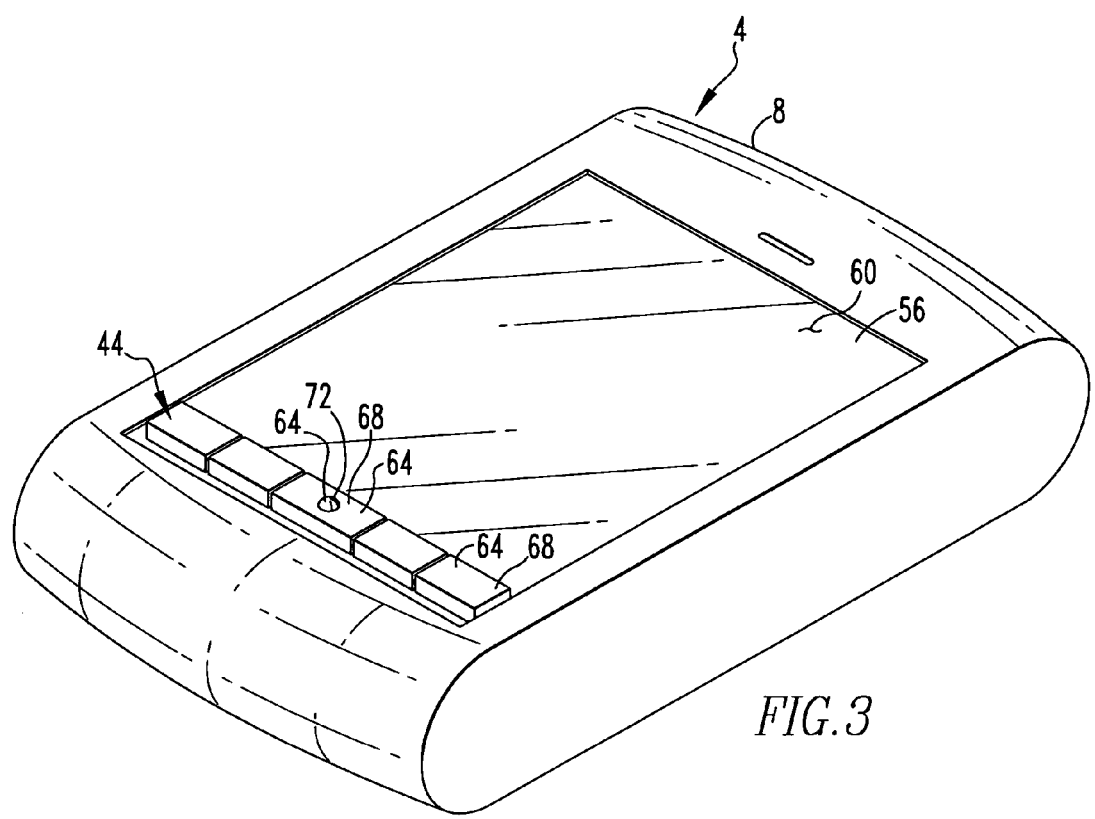
FIG. 3 is a perspective view of the handheld electronic device of FIG. 1, except depicting the keypad in a second configuration.
Figure 4:
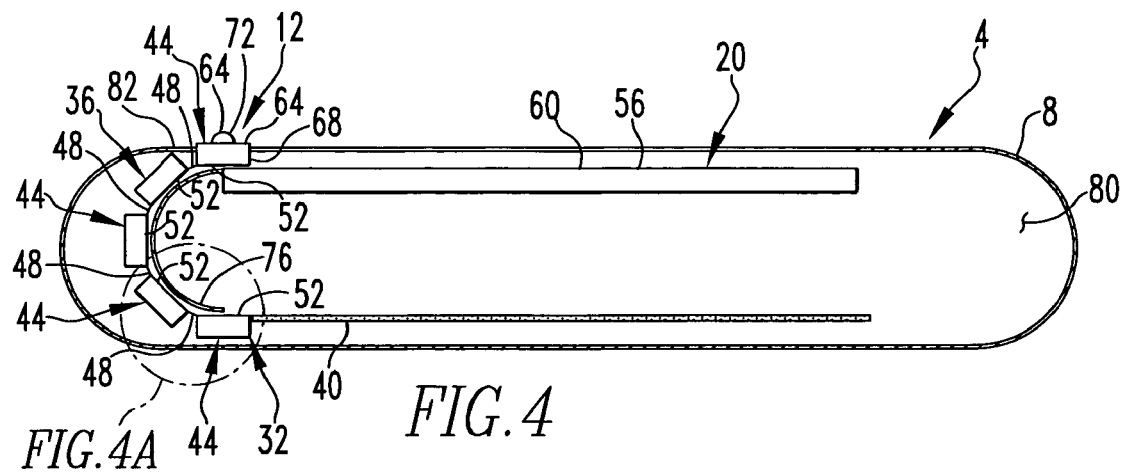
FIG. 4 is a sectional view as taken along line 4-4 of FIG. 3A.
Figure 4A:
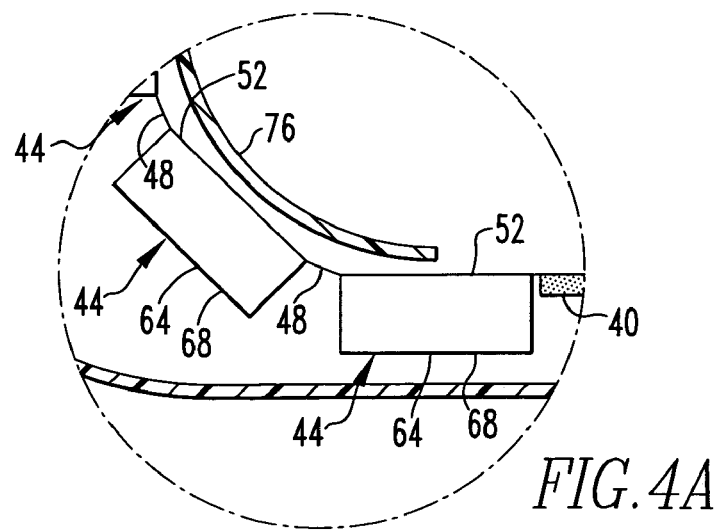
FIG. 4A is an enlarged view of an encircled portion of FIG. 4.

Specifically, in the configuration depicted in FIGS. 1-1B, five of the keypad portions 44 are in a deployed condition. In such condition, several of the keypad portions 44 overlie the display 56, thus reducing the viewable area of the display 56. The configuration depicted generally in FIGS. 3-4A depict only a single keypad portion 44 in a deployed condition, and depict four of the keypad portions 44 in a retracted condition, with at least some of the retracted keypad portions 44 being disposed at least partially within the interior 80 of the housing 8. The keypad portions 44 are movable into and out of the interior 80 through an opening 82 (FIGS. 1B and 4) that is formed in the housing 8.

In the exemplary embodiment depicted herein, the housing 8 includes a guide 76 within the interior 80 thereof to enable the retracted keypad portions 44 to be guided to a particular location within the interior 80. It is understood that the handheld electronic device 4 includes other components within the interior 80 and otherwise that are not expressly depicted herein.

They keypad assembly 32 can be moved between the first and second configurations by translating the keypad 36 with respect to the display 56. When the keypad 56 is translated from the first configuration toward the second configuration, certain of the keypad portions 44 are moved from a position overlying and or being disposed parallel with the display 56 to a location at least partially within the interior 80. The flexible nature of the connections 48 facilitates pivoting of one of the keypad portions 44 with respect to and adjacent keypad portion 44 when the keypad portions are moving into and/or out of the interior 80.

It thus can be seen that the first configuration of the keypad assembly 32, i.e., that depicted in FIGS. 1-1B, might be employed by a user where a relatively more complex keypad is required, i.e., a keypad-focused configuration. On the other hand, the configuration of the keypad assembly 32 depicted generally in FIGS. 3-4A could be employed where a complex keypad is relatively less important, and perhaps where a larger viewable area of the display 56 is relatively highly desired, i.e., a display-focused configuration. The handheld electronic device 4 thus is reconfigurable to allow the viewable area of the display 56 to be relatively increased or decreased in conjunction with a relative decrease or increase, respectively, of the operable region of the keypad 36. It is understood that the keypad 36 can alternatively be reconfigured in other fashions consecutively between the first configuration of FIGS. 1-1B and the second configuration of FIGS. 3-4A, i.e., the keypad 36 may be alternatively configured to have two, three, or four of the keypad portions 44 in a deployed condition.

Figure 3A:
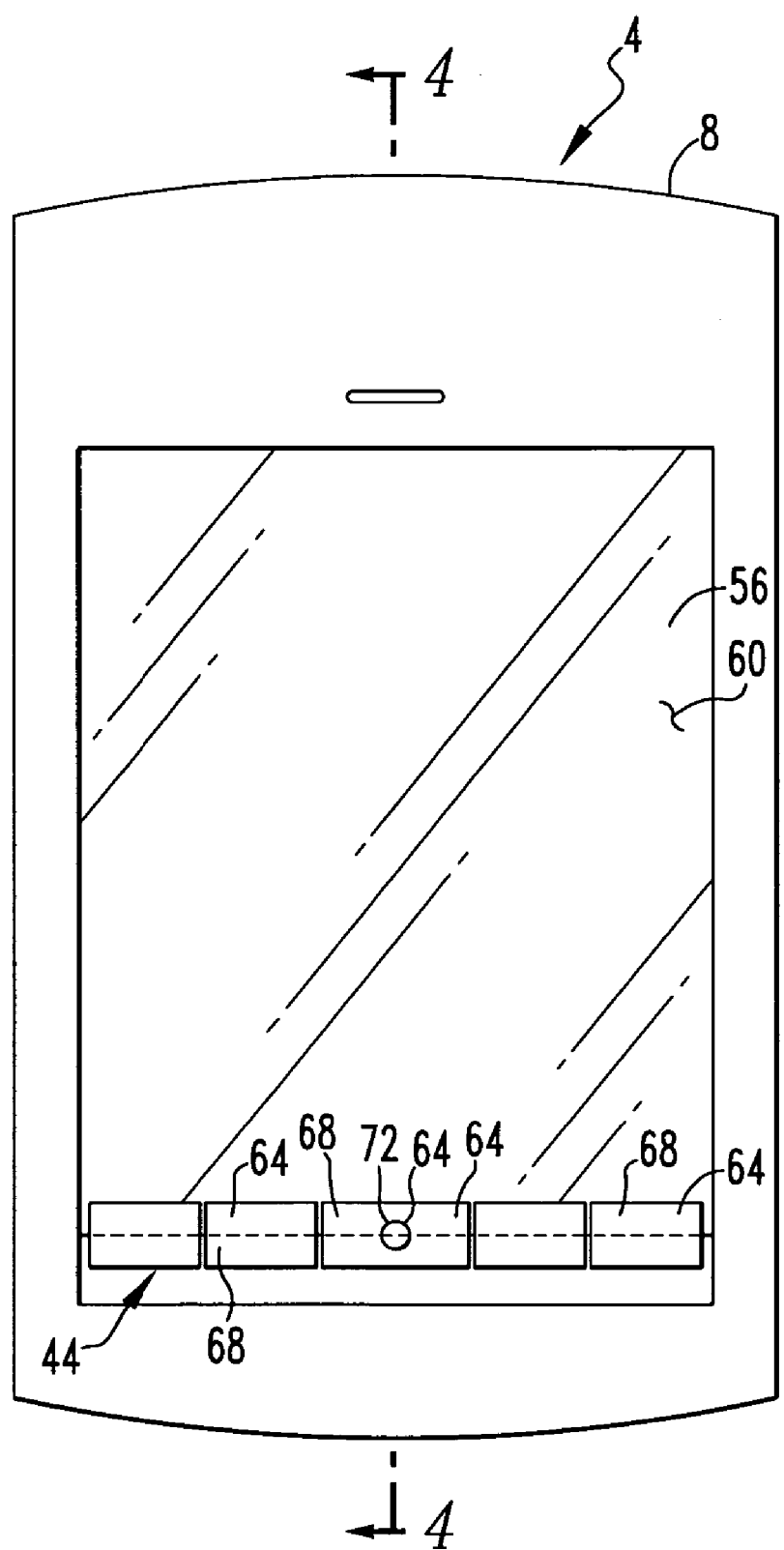
FIG. 3A is a front elevational view of the handheld electronic device as depicted in FIG. 3.

In the present exemplary embodiment depicted herein, the configuration of the keypad assembly 32 depicted in FIGS. 3-4A is in a fully retracted configuration, meaning that the deployed keypad portion 44 depicted in FIGS. 3 and 3A cannot be retracted. In other embodiments, however, the handheld electronic device could be configured to allow the remaining keypad portion 44 depicted in FIGS. 3 and 3A to be retracted in a fashion similar to the other keypad portions 44 of the keypad 36.

As can be understood from FIG. 1B, the facing surfaces 52 of the keypad portions 44 are oriented substantially parallel with and spaced slightly from the display surface 60. The display surface 60 may be configured to include a hardened surface that resists scratching by the keypad portions 44, which may enable the space between the facing surfaces 52 and the display surface 60 to be minimized.

As can further be seen from FIGS. 1-1B, the facing surfaces 52 of the deployed keypad portions 44 are oriented substantially coplanar, which enables the input members 64 to be oriented in a fashion with respect to one another that enables use as an ordinary keypad. The coplanar orientation of the facing surfaces 52 additionally enables the keypad portions 44 to be disposed closely adjacent the display surface 60. As can be understood from FIG. 4, however, the facing surface 52 of a retracted keypad portion 44 is noncoplanar with the facing surface 52 of an adjacent deployed keypad portion 44, and rather in the present example the facing surfaces 52 are oriented at an angle nonparallel with respect to one another. Also, the facing surface of a retracted keypad portion 44 is oriented at an angle nonparallel with respect to the display surface 60. As a general matter, a retracted keypad portion 44 can be inoperable to provide input to the processor 24 because, for instance, the input members 64 thereof are inaccessible or because the processor 24 ignores input therefrom, for example.

Figure 5:
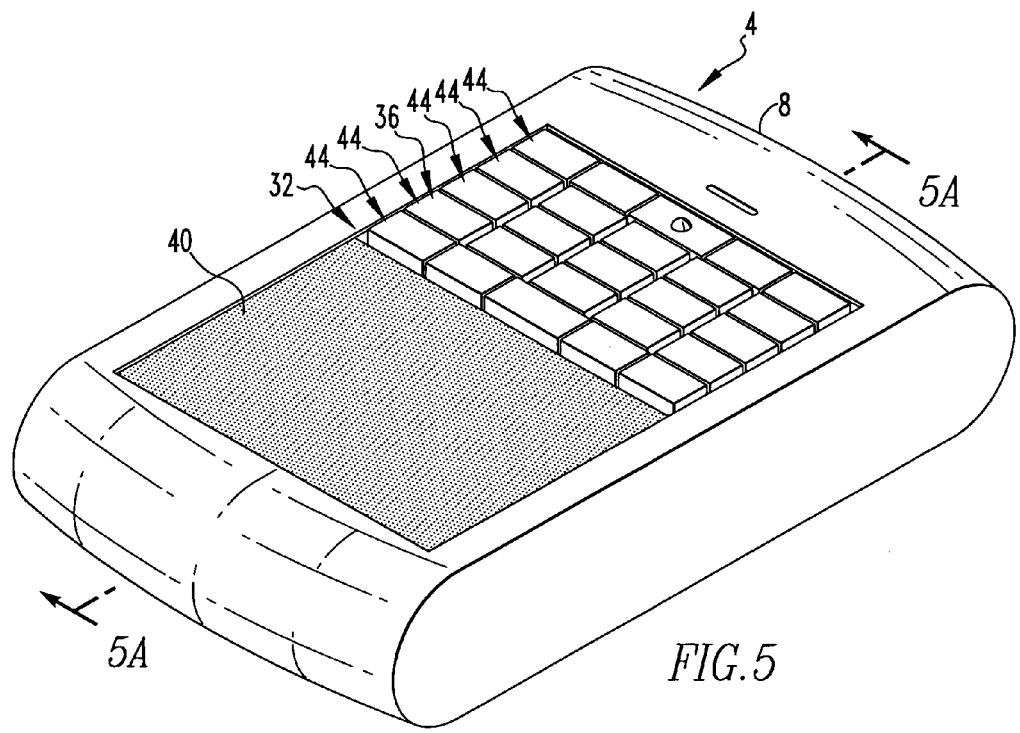
FIG. 5 is a perspective view of the handheld electronic device of FIG. 1 with the keypad in a third configuration.
Figure 5A:
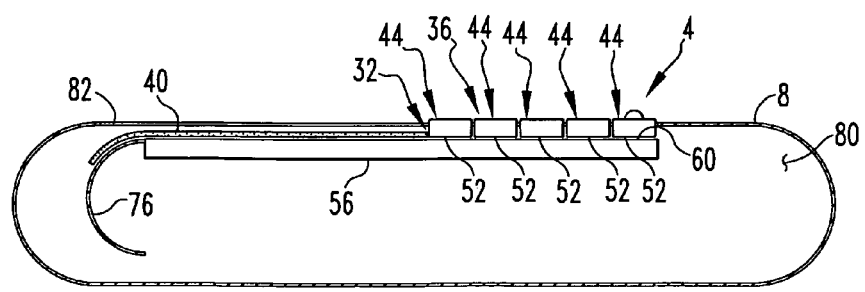
FIG. 5A is a sectional view as taken along line 5A-5A of FIG. 5.

As can be understood from FIGS. 5 and 5A, the keypad assembly 32 can be moved to a third configuration wherein the covering sheet 40 is in a deployed condition and overlies at least a portion of the display 56. The covering sheet 40 is a flexible sheet-like piece of material which, in the present exemplary embodiment, is formed out of a reduced reflectivity material. For instance, the covering sheet 40 may be a glare-reducing covering that enables the handheld electronic device 4 to be employed in bright light conditions by reducing the amount of ambient light that otherwise would be reflected from the display surface 60 into a user's eyes. Additionally or alternatively, the covering sheet 40 may be formed out of a non-reflective material that would be suited to, for instance, a military application wherein it might be desired that the handheld electronic device 4 be configurable to have no perceivable reflectivity.

The covering sheet 40 may be configured to be in the nature of a protective cover that can protect the display 56 from damage. In a similar fashion, the keypad 36 itself in the configuration depicted in FIGS. 5 and 5A overlies at least a portion of the display 56 and similarly provides protection from damage to that portion of the display 56.

The handheld electronic device 4 can be moved among the configuration depicted generally in FIGS. 1-1B, the configuration depicted generally in FIGS. 3-4A, and the configuration shown generally in FIGS. 5 and 5A by translating the keypad 36 with respect to the display 56. In moving from the configuration depicted generally in FIGS. 1-1B to the configuration depicted generally in FIGS. 5 and 5A, the keypad 36 is translated from a location disposed at an end of the display 56, as is depicted generally in FIG. 1, to a location disposed at an opposite end of the display 56, as is depicted generally in FIG. 5. Inasmuch as an end of the covering sheet 40 and an end of the keypad 36 are connected together, translation of the keypad 36 between the configurations depicted in FIGS. 1 and 5 similarly causes movement of the covering sheet 40 between a retracted position within the interior 80, as is depicted generally in FIG. 1B, and a deployed condition overlying the display 56, as is depicted generally in FIGS. 5 and 5A. In moving from the configuration depicted generally in FIGS. 3-4A to the configuration depicted generally in FIGS. 5 and 5A, the keypad 36 is translated from the location depicted generally in FIG. 1 to the location disposed at the opposite end of the display 56 depicted generally in FIG. 5, and the covering sheet 40 similarly moves therewith.

The handheld electronic device 4 may be switched off and keypad 36 rendered inoperable when the keypad assembly 32 is in the position depicted generally in FIG. 5. On the other hand, the handheld electronic device 4 may be configured such that the input members 56 are all operable to provide input to the processor 24 when the keypad assembly 32 is in the configuration depicted generally in FIG. 5.

It is understood that the processor 24 configures the display 56 to be capable of providing output on the portion thereof that is viewable, which is dependent upon the particular configuration of the keypad assembly 32 at any given time. That is, when the keypad assembly 32 is in the configuration depicted generally in FIGS. 1-1B, output on the display 56 is provided only on the visible portion thereof. When the keypad assembly 32 is in the configuration depicted generally in FIGS. 3-4, the viewable region of the display 56 is relatively larger than in the configuration of FIGS. 1-1B. The processor 24 reconfigures the display 56 to enable all visible portions of the display 56 to be capable of providing visual output. For example, an intelligent software link can exist between the configuration of the keypad 36 and the layout of the output of the application programs on the display 56. As such, moving the keypad 36 such that certain of the keypad portions 44 no longer overlie the display 56 increases the viewable area of the display 56, all of which can be used for visual output.

The handheld electronic device 4 thus advantageously has a keypad assembly 32 that can be configured in any of a variety of configurations, and that can be reconfigured as desired by a user to provide various configurations between and including a relatively display-oriented configuration and a relatively keypad-oriented configuration. The reconfigurable keypad assembly 32 advantageously enables a user to achieve different compromises between the keypad 36 and the display 56.

Figure 6:
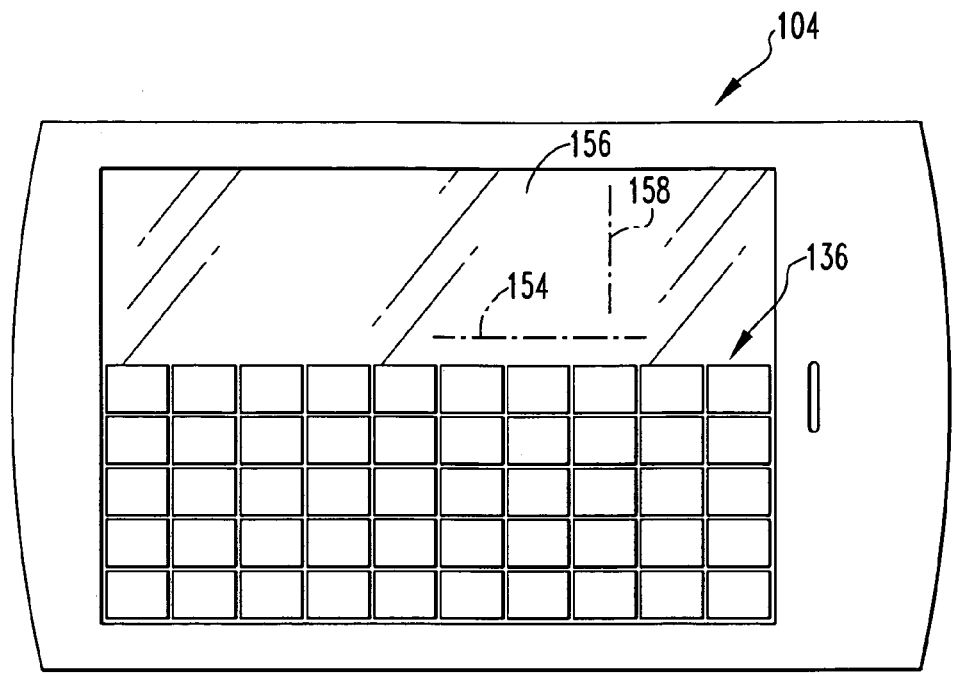
FIG. 6 is a front elevational view of a handheld electronic device in accordance with another embodiment of the disclosed and claimed concept, with a keypad of the handheld electronic device being in a first configuration.
Figure 7:
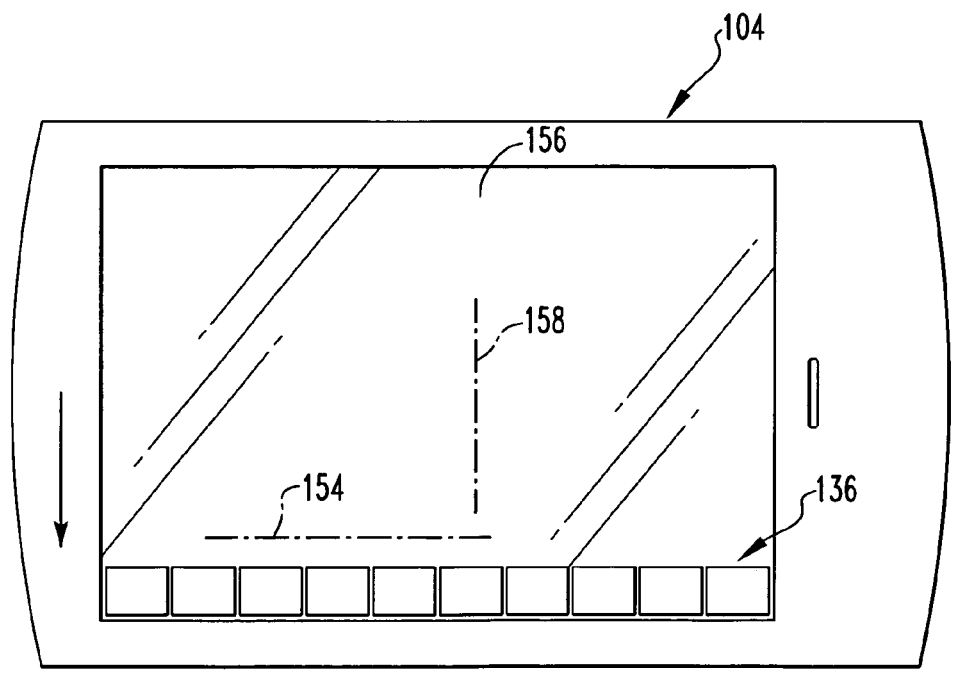
FIG. 7 is a front elevational view of the handheld electronic device of FIG. 6, with the keypad thereof in a second configuration.

An improved handheld electronic device 104 in accordance with another embodiment of the disclosed and claimed concepts is depicted generally in FIGS. 6 and 7. The handheld electronic device 104 is similar to the handheld electronic device 4, except that the keypad 136 and the display 156 of the handheld electronic device 104 are oriented in a "landscape" orientation, as compared with the "portrait" orientation of the keypad 36 and the display 56 of the handheld electronic device 4. The "landscape" orientation of the keypad 136 and the display 156 enables the keypad 136 to have a relatively larger number of keys in each row than the keypad 36, which facilitates making the keypad 136 configurable as a full QWERTY keyboard, for example and without limitation.

For instance, the display 156 can be said to have a major axis 156 extending along the relatively larger dimension thereof, and to further include a minor axis 158 extending along the relatively smaller dimension thereof. Movement of the keypad 136 among the various configurations between and including the configurations depicted in FIGS. 6 and 7 occurs by translating the keypad 136 in a direction generally perpendicular with the major axis 154.

Figure 8:
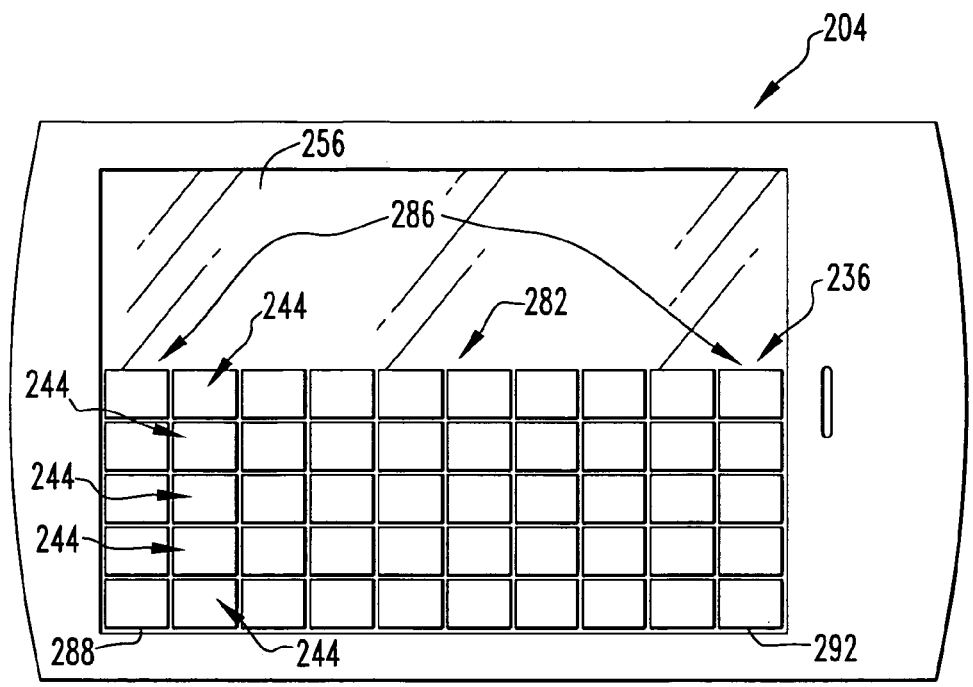
FIG. 8 is a front elevational view of a handheld electronic device in accordance with another embodiment of the disclosed and claimed concept, with a keypad of the handheld electronic device being in a first configuration.
Figure 9:
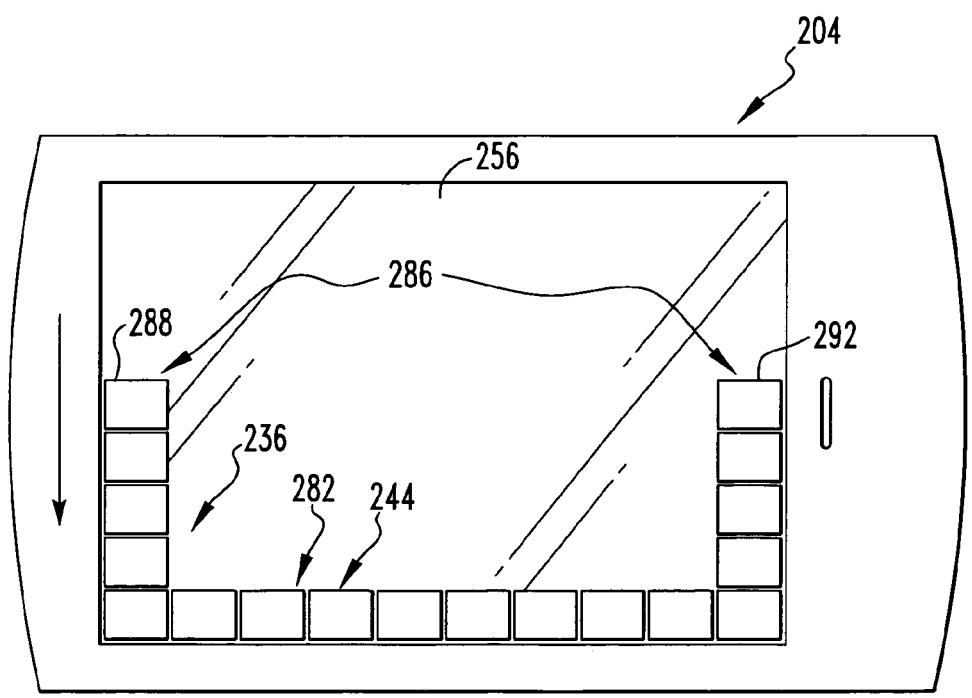
FIG. 9 is a front elevational view of the handheld electronic device of FIG. 8, with the keypad thereof in a second configuration.

Another handheld electronic device 204 in accordance with another embodiment of the disclosed and claimed concepts is depicted generally in FIGS. 8 and 9. The keypad 236 of the handheld electronic device 204 is similar to the keypad 136 depicted generally in FIGS. 6 and 7, except that the keypad 236 includes a movable portion 282 and a stationary portion 286. The movable portion 282 is movable with respect to the display 256 among a plurality of configurations between and including those depicted generally in FIGS. 8 and 9. However, the stationary portion 286 remains stationary with respect to the display 256. In the depicted exemplary embodiment, the stationary portion 286 includes a first stationary column 288 and a second stationary column 292 disposed at opposite ends of the display 256 and overlying portions of the display 256. In other embodiments, the stationary portion 286 may be configured to not overlie the display 256 without departing from the present disclosed and claimed concept. The keypad 236 is depicted in FIG. 8 as being fully deployed. In FIG. 9 the movable portion 282 is depicted as having only one of the keypad portions 244 deployed, the other keypad portions being retracted.

Figure 10:
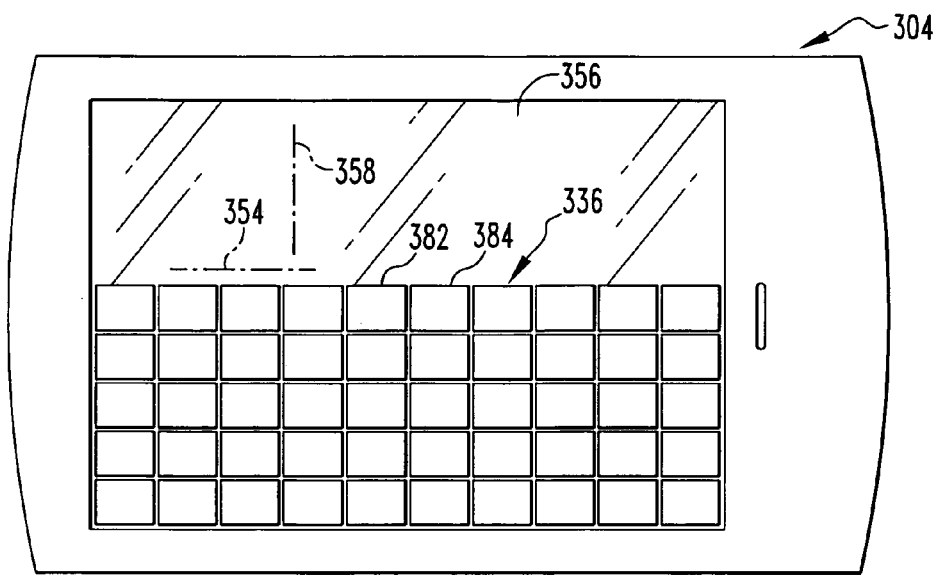
FIG. 10 is a front elevational view of a handheld electronic device in accordance with another embodiment of the disclosed and claimed concept, with a keypad of the handheld electronic device being in a first configuration.
Figure 11:
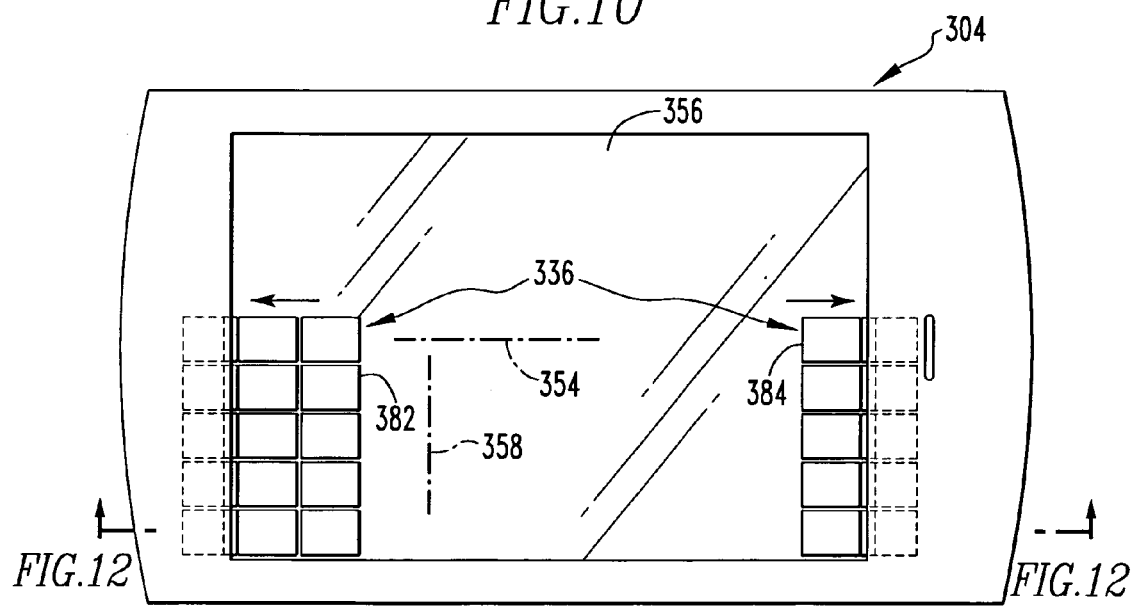
FIG. 11 is a front elevational view of the handheld electronic device of FIG. 10, with the keypad thereof in a second configuration.
Figure 12:
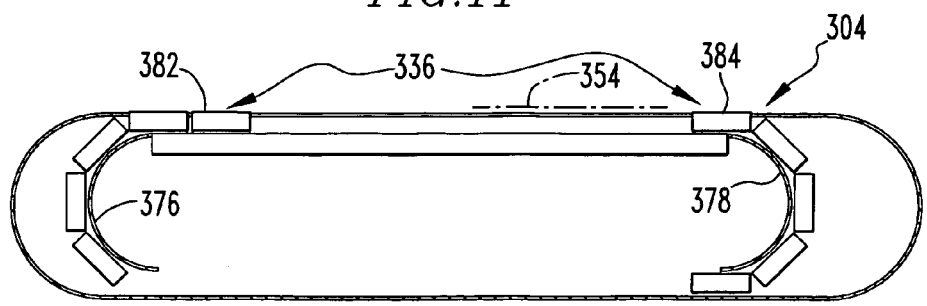
FIG. 12 is a sectional view as taken along line 12-12 of FIG. 11.
Figure 16:
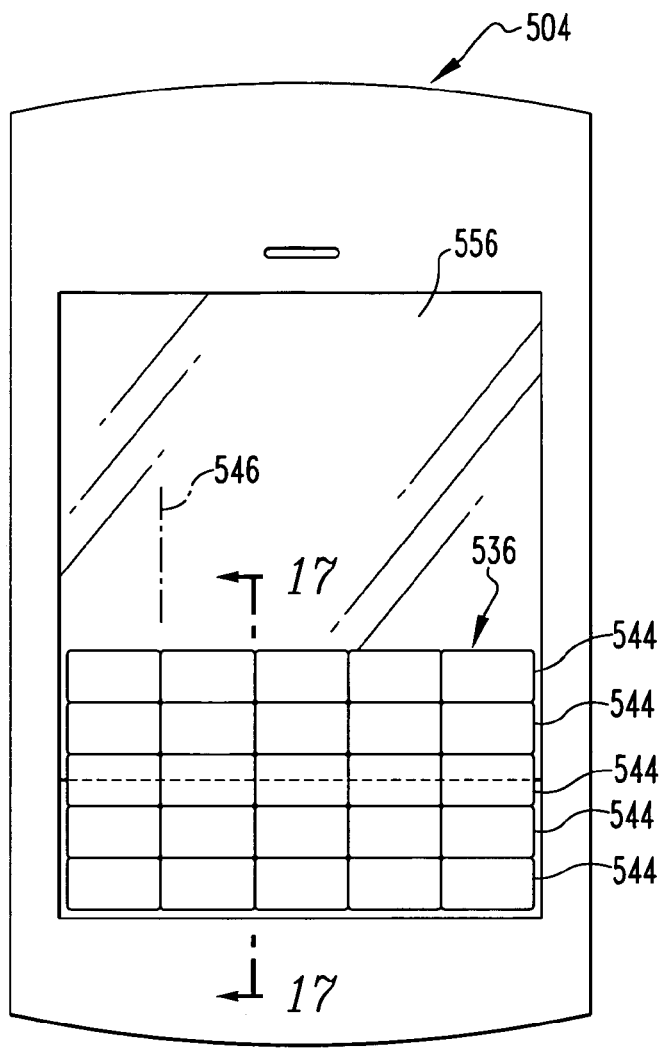
FIG. 16 is a front elevational view of a handheld electronic device in accordance with another embodiment of the disclosed and claimed concept, with a keypad of the handheld electronic device being in a first configuration.

Another improved handheld electronic device 304 in accordance with another embodiment of the disclosed and claimed concepts is depicted generally in FIGS. 10-12. The keypad 336 has a first movable portions 382 and a second movable portion 384 that are each independently movable between a deployed configuration, as is depicted generally in FIG. 10, and a condition at least partially retracted, as is indicated generally in FIGS. 11 and 12. In moving between the deployed and retracted conditions, the first and second movable portions 382 and 384 are movable away and toward one another. The handheld electronic device 304 has a first guide 376 and a second guide 378 disposed within the interior thereof. The first guide 376 serves to guide the retracted keypad portions of the first movable portion 382 within the interior of the handheld electronic device 304, and the second guide 378 serves to guide the retracted keypad portions of the second movable portion 384 within the interior of the handheld electronic device 304. The keypad 336 can be moved among a plurality of configurations between and including the configurations depicted generally in FIGS. 10-12, and, depending upon the particular embodiment, can be configured to fully retract within the interior of the handheld electronic device 304.

The display 356 can be said to have a major axis 354 and a minor axis 358. The first and second movable portions 382 and 384 can be said to be movable between the deployed and retracted positions along a direction generally parallel with the major axis 354. In the landscape configuration of the handheld electronic device 304, the movement of the first and second movable portions in opposite directions parallel with the major axis 354 advantageously enables a relatively wide keypad 336 to be accommodated within the interior of the handheld electronic device 304 by splitting the keypad 336 into separate movable portions.

Another handheld electronic device 404 in accordance with another embodiment of the disclosed and claimed concepts is depicted generally in FIGS. 13-15. The keypad 436 of the handheld electronic device 404 is similar to the keypad 36 of the handheld electronic device 4, except that the keypad portions of the keypad 436, when retracted, remain disposed at the exterior of the handheld electronic device 404, rather than being disposed within an interior region thereof. In the depicted exemplary embodiment, the handheld electronic device 404 has a housing 408 formed with a channel 494, and the keypad 436 is movable within the channel 494 between a deployed configuration and an at least partially retracted configuration. As the keypad portions 444 of the keypad 436 are moved from the deployed configuration toward the retracted configuration, the retracted keypad portions 444 move along an exterior surface 496 of the housing 408 within the channel 494.

In the depicted exemplary embodiment the keypad 494 in the fully deployed configuration is not disposed within the channel 494, and rather is disposed atop a lens 498 of the housing 408. It is noted that the other embodiments described herein can also include a lens without departing from the disclosed and claimed concept. In depicted exemplary embodiment, the channel 494 is depicted as being of an exaggerated shallow depth to more clearly depict the retracted keypad portions 444 disposed in the channel 494.

An improved handheld electronic device 504 in accordance with another embodiment of the disclosed and claimed concepts is depicted generally in FIGS. 16-19A. The keypad 536 is movable between an expanded configuration, such as is depicted generally in FIGS. 16-17A, and a compressed configuration depicted generally in FIGS. 18-19A. That is, the keypad portions 544 are elastically deformable between an expanded configuration, wherein at least some of the keypad portions 544 overlie the display 566, and a compressed condition wherein fewer or none of the keypad portions 544 overlie the display 556.

Figure 17:
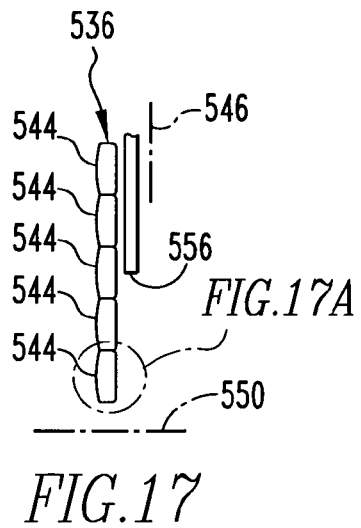
FIG. 17 is a sectional view as taken along line 17-17 of FIG. 16.
Figure 17A:
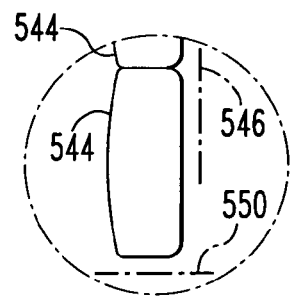
FIG. 17A is an enlarged view of an encircled portion of FIG. 17.
Figure 18:
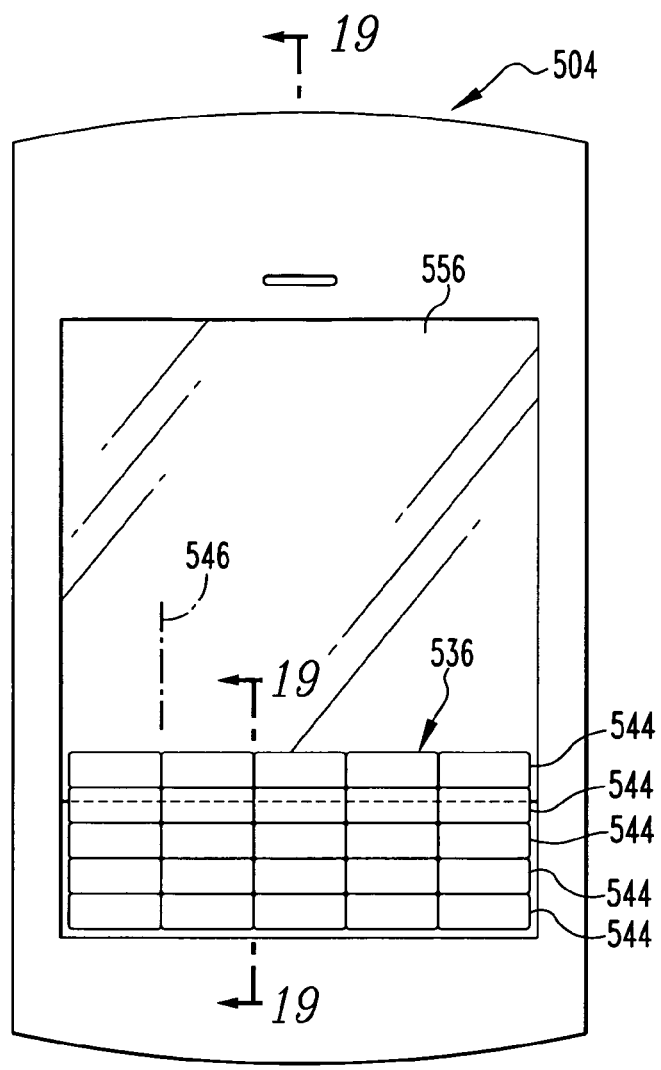
FIG. 18 is a front elevational view of the handheld electronic device of FIG. 16, except depicting the keypad thereof in a second configuration.
Figures 19, 19A:
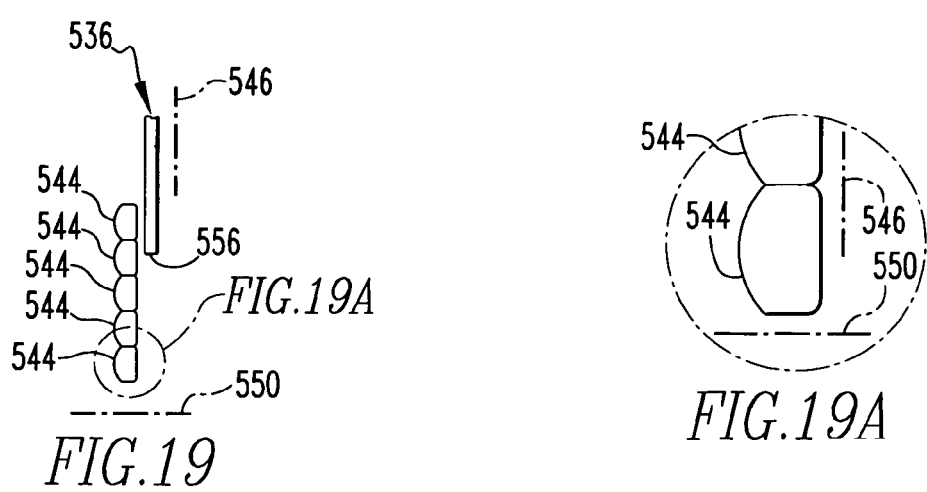
FIG. 19 is a sectional view as taken along line 19-19 of FIG. 18.
FIG. 19A is an enlarged view of an encircled portion of FIG. 19.

As can be particularly understood in FIGS. 17A and 19A, the keypad portions 544 are expandable and compressible along a first axis 546 to reveal relatively less and relatively more, respectively, of the display 566. In the expanded configuration, as is depicted generally in FIG. 17A, the keypad portions 544 each have a particular dimension along the first axis 546, and a second dimension along a second axis 550. The second axis 550 is transverse to the first axis 546. When the keypad portions 544 are in the compressed configuration, as is depicted generally in FIG. 19A, the dimension of the keypad portions 544 along the first axis 546 is reduced, and the dimension of the keypad portions along the second axis 550 is increased, compared with the dimensions of the keypad portions 544 in the expanded configuration.

The keys of the keypad portions 544 can be configured in any of a variety of ways to achieve such elastic deformability. For instance, the keypad portions 544 may each include a number of U-shaped springs which are elastically deflectable, although the keypad portions 544 can be configured in various other ways without departing from the present disclosed and claimed concept.

Figure 20:
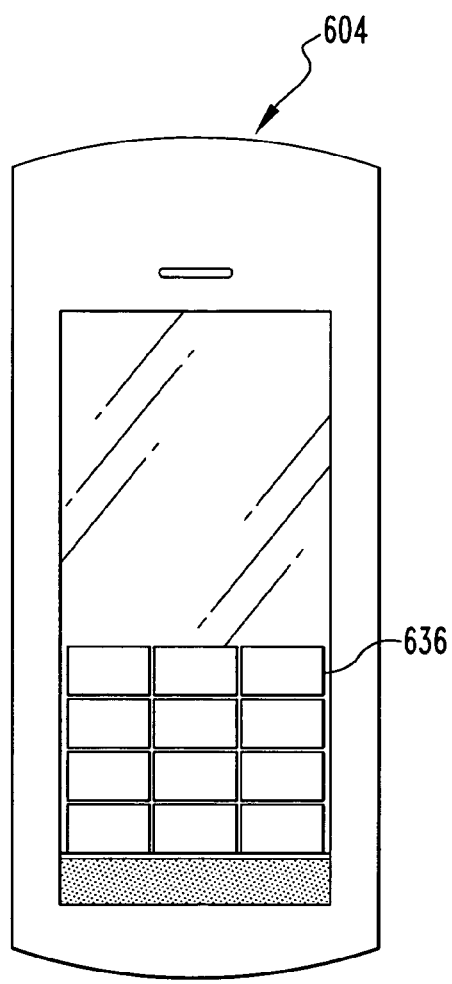
FIG. 20 is a front elevational view of a handheld electronic device in accordance with another embodiment of the disclosed and claimed concept, with a keypad of the handheld electronic device being in a first configuration.
Figure 21:
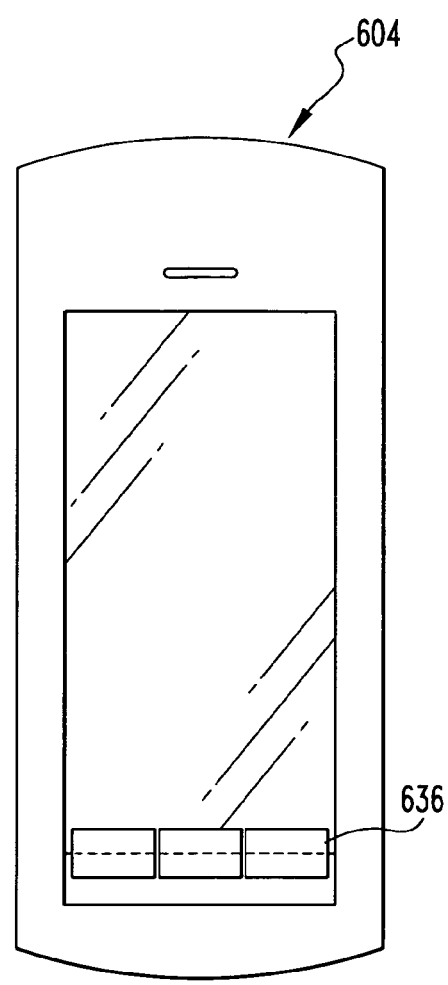
FIG. 21 is a front elevational view of the handheld electronic device of FIG. 20, with the keypad thereof in a second configuration.

Another improved handheld electronic device 604 in accordance with another embodiment of the disclosed and claimed concepts is depicted generally in FIGS. 20-21. The keypad 636 is depicted as being a conventional touch-tone telephone keypad that is movable between a deployed condition in FIG. 20 and an at least partially retracted condition in FIG. 21. It is noted that the keypad 636 also could be moved to a fully retracted condition.

It thus can be seen that a keypad of a device in accordance with the disclosed and claimed concepts can be of virtually any type of configuration. Examples of typical configurations would include, for instance, the touch-tone telephone keypad 656 of the handheld electronic device 604, the reduced keypad 36 of the handheld electronic device 4, and the full QWERTY keypad 136 of the handheld electronic device 104, without limitation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A keypad assembly for a handheld electronic device, the keypad assembly comprising:
    a keypad comprising a first keypad portion and a second keypad portion;
    at least some of the keypad assembly being movable between a first position and a second position;
    at least a portion of the first keypad portion and at least a portion of the second keypad portion being disposed substantially coplanar when the at least some of the keypad assembly is in the first position; and
    the at least portion of the first keypad portion and the at least portion of the second keypad portion being disposed noncoplanar when the at least some of the keypad assembly is in the second position,
    wherein the keypad is disposed at an exterior of a housing of the handheld electronic device when the at least some of the keypad assembly is in the first position and a retracted portion of the keypad remains entirely disposed at the exterior of the housing when the keypad assembly is in the second position.

2. The keypad assembly of claim 1 wherein the first and second keypad portions are flexibly connected together.

3. The keypad assembly of claim 1 wherein the keypad further comprises a connection extending between the first and second keypad portions, the connection being a flexible sheet-like member that flexibly connects together the first and second keypad portions.

4. The keypad assembly of claim 1 wherein the at least portion of the first keypad portion and the at least portion of the second keypad portion are oriented at an angle nonparallel with one another when the at least some of the keypad assembly is in the second position.

5. The handheld electronic device of claim 1 further comprising a flexible sheet-like piece of covering material structured to overlie a display of the handheld electronic device,
    wherein the keypad and the piece of covering material are connected together,
    wherein the piece of covering material is formed out of a reduced reflectivity material,
    wherein the covering material is a glare-reducing covering that is structured to be used in bright light conditions, and
    wherein the glare-reducing covering is structured to reduce ambient light.

6. The handheld electronic device of claim 1 wherein some of the keypad is elastically deformable,
    wherein some of the keypad in the first position having an expanded configuration and a first dimension along a first axis,
    wherein some of the keypad in the second position having a compressed condition and a second dimension along a second axis, and
    wherein the first dimension is larger than the second dimension when the at least portion of the keypad is in the first position and has an expanded configuration,
    wherein the second axis is transverse to the first axis and,
    wherein the first dimension along the first axis is reduced and the second dimension along the second axis is increased when the at least portion of the keypad is in the second position and has a compressed condition.

7. The handheld electronic device of claim 6 wherein some of the keypad in the first position has another first dimension along the second axis,
    wherein some of the keypad in the second position has another second dimension along the second axis, and
    wherein the another second dimension is larger than the another first dimension.

8. The handheld electronic device of claim 1 wherein a portion of the keypad is stationary,
wherein some of the keypad is disposed adjacent the stationary keypad portion when some of the keypad is in the first position, and
wherein some of the keypad is spaced from the stationary keypad portion when some of the keypad is in the second position.

9. A handheld electronic device comprising:
a housing;
a processor apparatus disposed at least partially on the housing and comprising a processor and a memory;
an input apparatus disposed at least partially on the housing and being structured to provide input to the processor apparatus;
the input apparatus comprising a keypad assembly, the keypad assembly comprising a keypad;
an output apparatus disposed at least partially on the housing and comprising a display, the output apparatus being structured to receive output from the processor apparatus;
at least a portion of the keypad assembly being movable between a first position and a second position, at least a portion of the keypad overlying a first area of the display and being operable to provide input to the processor when the at least portion of the keypad assembly is in the first position, the at least portion of the keypad overlying one of none of the display and a second area of the display smaller than the first area when the at least portion of the keypad assembly is in the second position,
wherein at least some of the at least portion of the keypad is elastically deformable, the at least portion of the keypad in the first position having an expanded configuration and a first dimension along a first axis, the at least portion of the keypad in the second position having a compressed condition and a second dimension along a second axis, the first dimension being larger than the second dimension when the at least portion of the keypad is in the first position and has an expanded configuration,
wherein the second axis is transverse to the first axis and,
wherein the first dimension along the first axis is reduced and the second dimension along the second axis is increased when the at least portion of the keypad is in the second position and has a compressed condition.

10. The handheld electronic device of claim 9 wherein the at least portion of the keypad in the first position has another first dimension along the second axis, the at least portion of the keypad in the second position having another second dimension along the second axis, the another second dimension being larger than the another first dimension.

11. The handheld electronic device of claim 9 wherein the housing is of a predetermined form factor when the at least portion of the keypad assembly is in the first position, the housing being of the predetermined form factor when the at least portion of the keypad assembly is in the second position.

12. The handheld electronic device of claim 11 wherein the predetermined form factor is substantially unvarying between the first position and the second position of the at least portion of the keypad assembly.

13. The handheld electronic device of claim 9 wherein at least some of the keypad is in a retracted condition disposed within an interior of the housing when the at least portion of the keypad assembly is in the second position.

14. The handheld electronic device of claim 13 wherein another portion of the keypad is in a deployed condition operable to provide input to the processor when the at least portion of the keypad assembly is in the second position.

15. The handheld electronic device of claim 9 wherein the keypad comprises a first keypad portion and a second keypad portion, at least a portion of the first keypad portion and at least a portion of the second keypad portion being disposed substantially coplanar when the at least portion of the keypad assembly is in the first position, and the at least portion of the first keypad portion and the at least portion of the second keypad portion being disposed noncoplanar when the at least portion of the keypad assembly is in the second position.

16. The handheld electronic device of claim 15 wherein the at least portion of the first keypad portion and the at least portion of the second keypad portion are oriented at an angle nonparallel with one another when the at least portion of the keypad assembly is in the second position.

17. The handheld electronic device of claim 9 wherein the keypad is disposed at an exterior of the housing when the at least portion of the keypad assembly is in the first position and a retracted portion of the keypad remains entirely disposed at the exterior of the housing when the keypad assembly is in the second position.

18. The handheld electronic device of claim 9 wherein at least some of the keypad is translatable with respect to the display along an axis parallel with a surface of the display.

19. The handheld electronic device of claim 9 wherein another portion of the keypad overlies another first area of the display and is operable to provide Input to the processor when the at least portion of the keypad assembly is in the first position, the another portion of the keypad overlying one of none of the display and another second area of the display smaller than the another first area when the at least portion of the keypad assembly is in the second position, the at least portion of the keypad and the another portion of the keypad each being movable away from one another from the first position toward the second position.

20. The handheld electronic device of claim 19 wherein the display has a major axis and a minor axis, the at least portion of the keypad and the another portion of the keypad each being movable away from one another in a direction substantially parallel with the major axis.

21. The handheld electronic device of claim 9 wherein another portion of the keypad is stationary, at least some of the at least portion of the keypad being disposed adjacent at least some of the another portion of the keypad when the at least portion of the keypad assembly is in the first position, the at least some of the at least portion of the keypad being spaced from the at least some of the another portion of the keypad when the at least portion of the keypad assembly is in the second position.

22. The handheld electronic device of claim 9 wherein the keypad assembly further comprises a flexible sheet-like piece of covering material, at least a portion of the piece of covering material overlying a region of the display when the at least portion of the keypad assembly is in the second position, the at least portion of the piece of covering material overlying one of none of the display and another region of the display smaller than the region when the at least portion of the keypad assembly is in the first position.

23. The handheld electronic device of claim 9 wherein the display has a major axis and a minor axis, the at least a portion of the keypad assembly being movable between the first and second positions in a direction substantially perpendicular with the major axis.

* * * * *